United States Patent [19]

Barrus

[11] Patent Number: 4,953,809

[45] Date of Patent: Sep. 4, 1990

[54] MICROPHONE RETRIEVAL DEVICE

[76] Inventor: Stephen D. Barrus, 52 Afton, Rochester, N.Y. 14612

[21] Appl. No.: 369,082

[22] Filed: Jun. 20, 1989

[51] Int. Cl.⁵ .............................................. B65H 75/48
[52] U.S. Cl. ...................... 242/107.300; 242/107.500; 381/169
[58] Field of Search ............... 242/107.3, 107.5, 107.6, 242/107.7, 107.11, 107.12, 107.2; 381/169; 191/12.2 R, 12.4; 379/441, 442, 446, 454, 455

[56] References Cited

U.S. PATENT DOCUMENTS

| | | | |
|---|---|---|---|
| 885,074 | 4/1908 | Nidever | 242/107.5 |
| 939,971 | 11/1909 | Brennan | 242/107.6 |
| 2,596,648 | 5/1952 | Bugg et al. | 242/107.5 |
| 2,969,436 | 1/1961 | Kilyk | 381/169 |
| 3,012,736 | 12/1961 | Brust | 242/107.5 |
| 3,065,925 | 11/1962 | Appleton | 242/107.5 |
| 4,146,191 | 3/1979 | Cavanaugh | 242/107 |
| 4,592,148 | 6/1986 | Longenette | 242/107.5 |
| 4,722,495 | 2/1988 | Meredith | 242/107.3 X |
| 4,825,589 | 5/1989 | Straw et al. | 242/107.12 |
| 4,856,070 | 8/1989 | Britton et al. | 242/107.7 |

Primary Examiner—John M. Jillions
Attorney, Agent, or Firm—Howard J. Greenwald

[57] ABSTRACT

An apparatus for retrieving a microphone is disclosed. The apparatus contains a body assembly to which the microphone is removably attached. One end of a line cord is retractably attached to the body assembly, and the other end of the cord may be attached to a surface of a vehicle. The apparatus contains a braking device, allowing one to slow the rate of retraction of the line cord into the device.

18 Claims, 3 Drawing Sheets

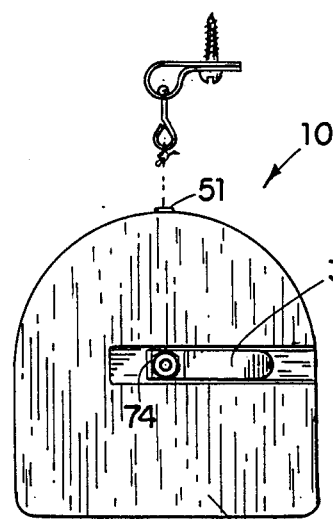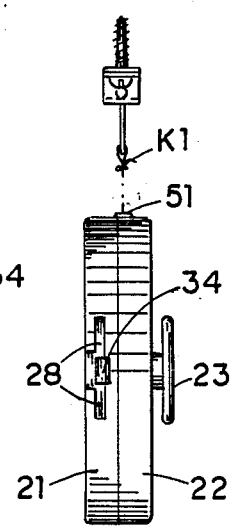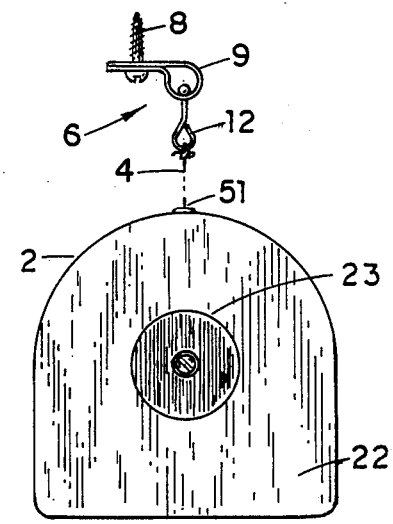
FIG. 1　　　FIG. 2　　　FIG. 3
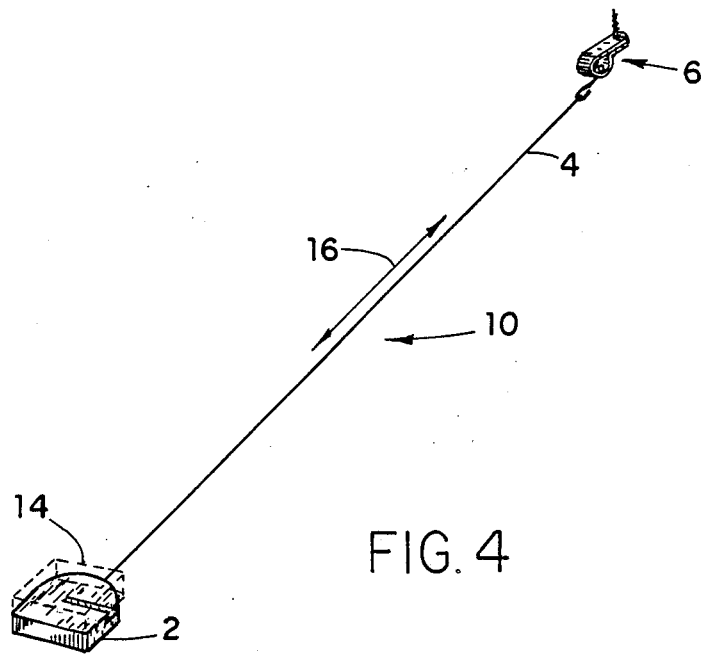
FIG. 4

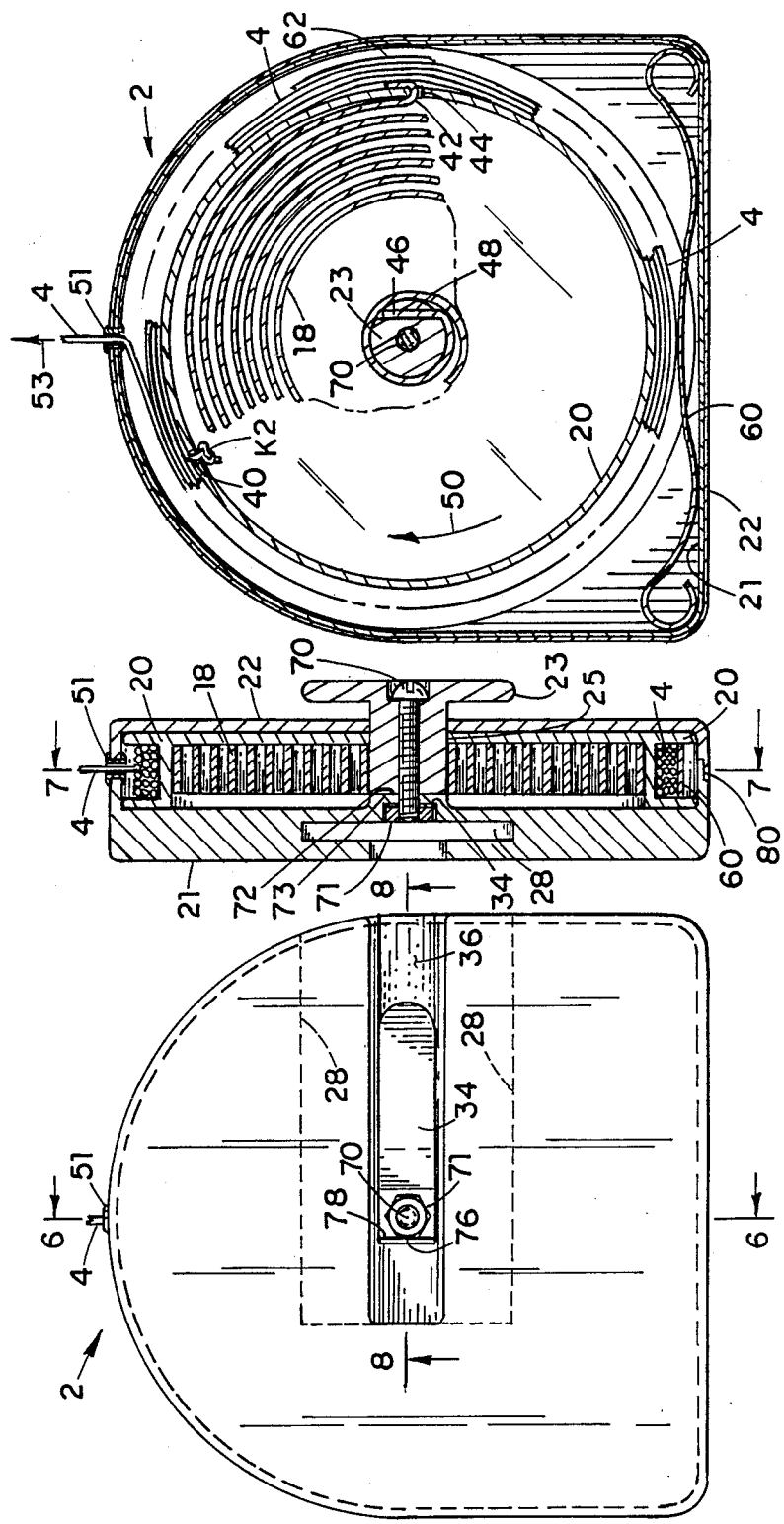

MICROPHONE RETRIEVAL DEVICE

FIELD OF THE INVENTION

An apparatus for retrieving a microphone which is especially useful by operators of Citzens' Band transceivers is disclosed. The microphone is removably and retractably attached to the apparatus.

BACKGROUND OF THE INVENTION

Citzens' Band transceivers are often used by truck drivers, ship-to-shore radio operators, and others. These transceivers contain a radio microphone which, while the operator is broadcasting, must be held in his hand. However, the need often arises for the operator to release the microphone to tend to emergency driving needs such as, e.g., shifting truck gears, maneuvering a boat, etc.

With the prior art devices, when an emergency arises requiring the use of both of the operator's hands, the operator must drop the microphone. Sometimes the dropped microphone lands in a dangerous area such as, e.g., the truck steering wheel or into the shift operation.

It is an object of this invention to provide a microphone retrieval device which will retract a microphone once it has been dropped by an operator. It is another object of this invention to provide a means for insuring that the microphone is always in the same position when not in use by the operator. It is another object of this invention to provide a device which will retract the microphone so that the microphone will not be damaged when it impacts the body into which it is being retracted.

SUMMARY OF THE INVENTION

In accordance with this invention, an apparatus for retrieving a microphone is disclosed. This apparatus contains a body assembly to which the microphone is removably attached. One end of a line cord is retractably attached to the body assembly, and the other end of the cord may be attached to a surface of a vehicle. The apparatus contains a braking device, allowing one to slow the rate of retraction of the line cord into the device.

DESCRIPTION OF THE DRAWINGS

The present invention will be more fully understood by reference to the following detailed description thereof, when read in conjunction with the attached drawings, wherein like reference numerals refer to like elements, and wherein:

FIG. 1 is a front elevational view of a preferred embodiment of microphone retrieval device of the invention;

FIG. 2 is a side elevational view of the preferred embodiment;

FIG. 3 is a rear elevational view of the preferred embodiment;

FIG. 4 is a perspective view of the preferred embodiment in an extended position;

FIG. 5 is a front elevational view of the preferred embodiment, illustrating the device's mounting slot;

FIG. 6 is a cross-sectional elevation view taken along line 6—6 of FIG. 5;

FIG. 7 is a cross-sectional elevation view taken along line 7—7 of FIG. 6.

DESCRIPTION OF THE PREFERRED EMBODIMENTS

Figure 8:
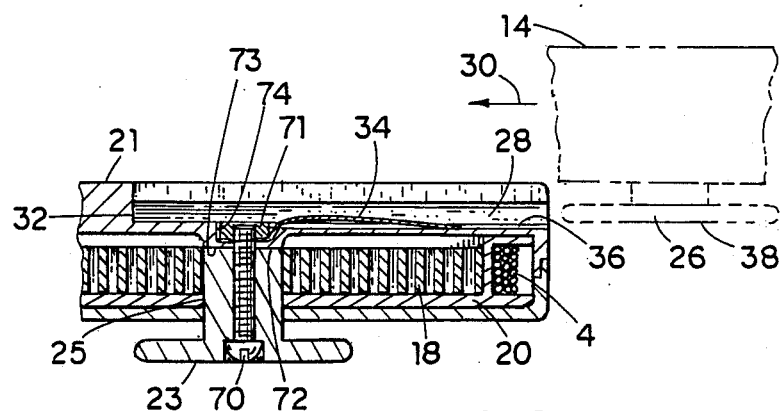
FIG. 8 is a partial cross-section taken along line 8—8 of FIG. 5.

Referring to FIGS. 1-9, a preferred embodiment of microphone retrieval device 10 is illustrated. This embodiment is comprised of body 2, line cord 4, and mounting assembly 6.

Line cord 4 is removably and retrievably attached to body 2, which contains means for retracting the cord once a portion of it has been removed from the body. In one preferred embodiment, cord 4 is nylon monofilament line which, preferably, is about five feet in length when fully extended from body 2. While the cord 4 in the preferred embodiment is monofilament nylon, and preferably of about thirty pounds test, it is understood that waxed or unwaxed string or cord, metallic wire, or other plastic materials (such as polyester and the like, or various organic or inorganic tapes) may be substituted for the nylon monofilament. Cord 4 may be any form of line, cord, or cable, preferably with a tensile strength of from about 30 to about 40 pounds and a length of from about 4 to about 6 feet.

The distal end of line cord 4 is attached to mounting assembly 6. Any conventional means of securing the distal end of line cord 4 to a surface may be used as assembly 6. In the embodiment illustrated in FIG. 3, the securing means 6 comprises a clasp 9, and a wire shape 12; screw 8 may be inserted through a hole in clasp 9 to attach the assembly 6 to a surface. As is illustrated in FIG. 4, line 4 is attached to wire shape 12 by means of tied knot K1. Other means for securing the distal end of line cord 4 include an upholstery screw, a CB casing screw, etc.

Microphone retriever device 10 is adapted to have a microphone, such as a citizen's band microphone, mounted on it. As is well known to those skilled in the art, a microphone is an electro-acoustic device containing a transducer which is actuated by sound waves and delivers essentially equivalent electric waves; see, e.g., pages 425-434A of Volume 8 of the McGraw-Hill Encylopedia of Science & Technology, (McGraw-Hill Book Company, New York, 1977).

Microphone retrieval device 10 comprises a device for removably attaching a microphone to body 2. Referring to FIG. 4, microphone 14 is shown in dotted lines 14 as it would be positioned and attached to body assembly 2. As is indicated by arrow 16, the body assembly 2 and the attached microphone 14 are able to move toward and away from the fixed location mounting assembly 6. Line cord 4 is removably and retractably secured within body assembly 2. An operator can pull the microphone away from the fixed location mounting assembly 6; and, upon the release of the microphone 14 and body assembly 2, the units are directed to and moved toward the fixed location mounting assembly 6.

In one preferred embodiment, microphone 14 is a citizen's band microphone. This microphone comprises a universal type mounting boss on its back side; in one preferred embodiment, illustrated in phantom detail in FIG. 8, the mounting boss is a knob which has a diameter of about 0.72 inches and a width of about 0.09 inches. Referring to FIG. 8, mounting boss 26 may be inserted into T-shaped receiving slot 28.

Any means for retractably securing line cord 4 to body 2 may be used. In the embodiment illustrated in the FIGS., tension on line cord 4 is provided by a clockspring 18 attached to a monofilament spool 20, both of which are located inside the body assembly 2; see, e.g., FIGS. 6 and 7. In this embodiment, the monofilament spool 20 is rotatably journaled on the smaller diameter portion 25 of the tension adjuster 23.

In the preferred embodiment illustrated in the FIGS., tension is applied to line cord 4 in order to retrieve an unattended microphone 14 and body assembly 2 to a position in close proximity to mounting assembly 6. Referring to FIGS. 6 and 7, line cord 4 is caused to wind about spool 20 by means of a clockspring 18 located within and attached to spool 20 by means of a spring and loop 42 engaging spool slot 44. The opposite end of the clockspring 18 is attached to tension adjuster 23 by means of a spring and tab 46 inserted in tension adjuster slot 48. The line cord 4 is attached to the spool 20 by means of a knot K2 tied in the end of the cord after it's been passed through hole 40 in spool 20 (see FIG. 6).

Referring to FIG. 7, it can be seen that pulling line cord 4 in the direction of arrow 53 (as occurs when an operator pulls the mounted microphone 14 towards him from its position near mounting assembly 6) will tend to unwind the line cord 4 from the spool 20 through grommet 51 while, at the same time, winding up clockspring 18; the stored torque in clockspring 18 can later be used to return the body assembly and microphone 14, when released to the operator, to the fixed location mounting assembly 6 position. When the body assembly is being retracted, it will impact the mounting surface and absorb most of the shock of impact, thereby minimizing the amount of shock the microphone is subjected to.

The microphone retrieval device 10 is equipped with means for slowing the retraction of line cord 20 into body 2. As will be apparent to those skilled in the art, a too rapid return of the microphone 14 and body assembly 2 to the fixed location mounting assembly 6 position could easily cause damage to the delicate microphone if it were to forcibly impact on the fixed location mounting assembly 6 when all the line cord is reeled onto the spool 20. Thus, several features of the invention are directed towards preventing such an occurrence.

Referring to FIGS. 6 and 7, a flat spring 60 is shaped and situated in such a manner that it frictionally rubs against line cord 4 as the spool rotates during the rewinding operation. As more of the line cord 4 is rewound onto the spool 20, the outside diameter of the line cord windings increases and compresses spring 60, thus causing ever more frictional resistance between the line cord 4 and the spring 60. Thus, as the clockspring 18 depletes its stored-up torque, and the braking action of the spring 60 against the wound up line cord 4 becomes greater, the speed of the rotation of the spool 20 becomes less.

Another means for slowing the rate of retraction of line cord 4 to spool 20 is the presence of a localized high spot. There is a localized high spot 62 on the outside diameter of the wound up line cord 4 over the localized area of clockspring loop 42; see FIG. 7. This localized high spot tends to compress the braking spring 60 even more on an intermittent, once every revolution basis, thus further braking the speed at which the microphone 14 and body assembly 2 travel to the fixed location mounting assembly 6.

In addition to two separate means for slowing the rate of retraction of the line cord to spool 20, the microphone retrieval device 10 also contains means for adjusting the amount tension imparted upon line cord 20 by clockspring 18. The retraction speed of spool 20 may be controlled by means of a friction between surface 73 of tension adjuster 23 and surface 72 of body half 21, with the clamping force for these two rubbing surfaces provided by turning screw 70 into non-rotating nut 71. Referring to FIG. 5, one flat surface 76 of the nut 71 rests against the up-turned ear 78 of spring 34, forming locking arrangement 74. As spring 34 rests in groove 36 of body half 21, no rotation of the nut 71 can occur. By loosening the screw 70 and rotating mounting boss 23, the amount of pre-load in the clockspring 18 can be adjusted for various weights of microphones so that, e.g., the microphone 14 may be held in place at the fixed location mounting assembly 6 but without torque from the clockspring 18 attempting to pull it more tightly against the fixed location mounting assembly. Once the torque adjustment has been made, the adjustment screw 70 then may be retightened to maintain the desired pre-load condition of the clockspring 18, i.e., with no excess torque delivered.

The microphone retrieval device is also equipped with means for removably attaching a microphone to it. One such preferred means is illustrated in FIGS. 4, 5, 6, 7, 8, and 9.

All citizens' band microphones have a circular mounting boss with dimensions prescribed by CB industry standards. This mounting boss, which is described in another portion of this specification, is designed to slide into a receiving slot on a citizens' band transmitter, thus providing a means for storing the microphone when it is not in use.

Figure 9:
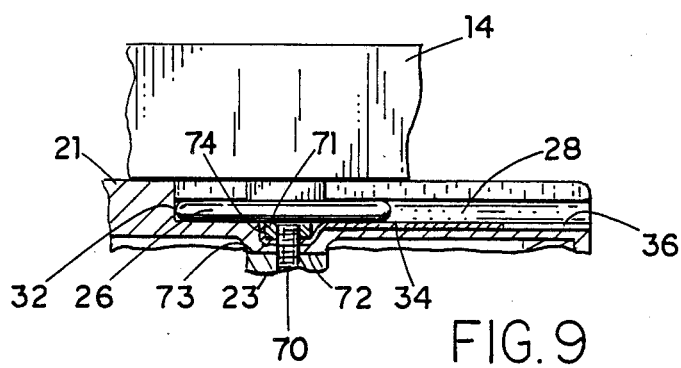
FIG. 9 is a partial cross-sectional view similar to FIG. 8.

A typical microphone boss is shown in side elevation by phantom lines as a portion of microphone 14 (see FIG. 8). The T-shaped receiving slot 28 of body half 21 is shown in detail in FIGS. 5 and 6 and is formed to the same citizens band industry standards with respect to dimensions and shape as the similar receiving slot earlier described with respect to citzens band transmitters. Referring to FIGS. 8 and 9, it will be apparent that the microphone mounting boss 26, when moved in the direction of arrow 30, will enter the T-shaped receiving slot 28 and can be further inserted until the microphone mounting boss 26 reaches the end wall 32 of receiving slot 28. To enhance retention of the microphone mounting boss in receiving slot 28, a flat spring 34 is depressed into groove 36 by surface 38 of the microphone mounting boss 26, thus providing a frictional detent to hold the microphone in the correct position relative to the body assembly 2 (see FIGS. 2 and 9).

The tension adjuster 23 is similar in shape and size to the mounting boss 26 on microphone 14 and is located on the body assembly rear surface, or the side opposite the T-shaped receiving slot 28. The purpose of the tension adjuster 23 is not only to adjust tension but also to allow storage of the microphone 14 and body assembly 2 in the standard receiving slot of a citizens band transmitter, if so desired.

Body 2 of microphone retrieval device 10 may be constructed by means well known to those skilled in the art. Thus, by way of illustration, in the embodiment illustrated in the FIGS. body 2 is comprised of body halves 21 and 22. It is preferred that body halves 21 and 22, spool 20, and tension adjuster 23 be injection molded parts made from filled or unfilled thermoplastic material; suitable thermoplastic material includes, e.g., nylon, styrene, polypropylene, etc. Alternatively, some or all of body halves 21 and 22, spool 20, and tension adjuster 23 may be made of metal (such as zinc, or aluminum die castings), thermoset plastic (such as phenolics, alkyds, and the like), or mixtures thereof. Other suitable construction materials will be apparent to those skilled in the art.

Body half 21 and body half 22 may be connected to each other at overlapping joint 80 by conventional means such as, e.g., ultrasonic welding, glue, snap joints, or other conventional means.

It is to be understood that the aforementioned description is illustrative only and that changes can be made in the apparatus, the ingredients and their proportions, and in the sequence of combinations and process steps as well as in other aspects of the invention discussed herein without departing from the scope of the invention as defined in the following claims.

I claim:

1. An apparatus for retrieving a microphone, comprised of:
   (a) an extendable and retractable body assembly;
   (b) means for extendably connecting said body assembly to an interior surface of a vehicle;
   (c) means for removably attaching a microphone to said body assembly;
   (d) a line cord attached to said body assembly, wherein said cord comprises a first end and a second end, and wherein said first end of said line cord is attached to said body assembly;
   (e) means for attaching said second end of said line cord to an interior surface of a vehicle;
   (f) means for imparting tension to said line cord, which means are disposed within said body assembly;
   (g) means for adjusting the amount of tension imparted to said line cord, which means are disposed within said body assembly;
   (h) means for retracting said line cord into said body assembly of said apparatus, which means are disposed within said body assembly; and
   (i) means for slowing the rate of retraction of said line cord into said body assembly, which means are disposed within said body assembly.

2. The apparatus as recited in claim 1, wherein said line cord is from about 4 to about 6 feet long.

3. The apparatus as recited in claim 2, wherein said means for slowing the rate of retraction of said line cord into said body assembly comprises a spring in frictional contact with said line cord.

4. The apparatus as recited in claim 3, wherein said line cord is a nylon monofilament line.

5. The apparatus as recited in claim 4, wherein said nylon monofilament line is about five feet long.

6. The apparatus as recited in claim 5, wherein said nylon monofilament line has a tensile strength of from about 30 to about 40 pounds.

7. The apparatus as recited in claim 3, wherein said means for attaching said second end of said line cord to a surface is comprised of a clasp and a wire shape.

8. The apparatus as recited in claim 3, wherein said means for retracting said line cord into said body assembly of said apparatus is comprised of a clockspring.

9. The apparatus as recited in claim 8, wherein said clockspring is attached to a monofilament spool.

10. The apparatus as recited in claim 9, wherein said clockspring is disposed within said body assembly.

11. The apparatus as recited in claim 10, wherein said monofilament spool is disposed within said body assembly.

12. The apparatus as recited in claim 11, wherein said line cord is attached to a wire shape.

13. The apparatus as recited in claim 12, wherein said line cord is attached to said wire shape by a tied knot.

14. The apparatus as recited in claim 12, wherein said line cord is a nylon monofilament line.

15. The apparatus as recited in claim 14, wherein said nylon monofilament line is about five feet long.

16. The apparatus as recited in claim 15, wherein said nylon monofilament line has a tensile strength of from about 30 to about 40 pounds.

17. The apparatus as recited in claim 3, wherein said line cord is metallic wire.

* * * * *